Figure 1:
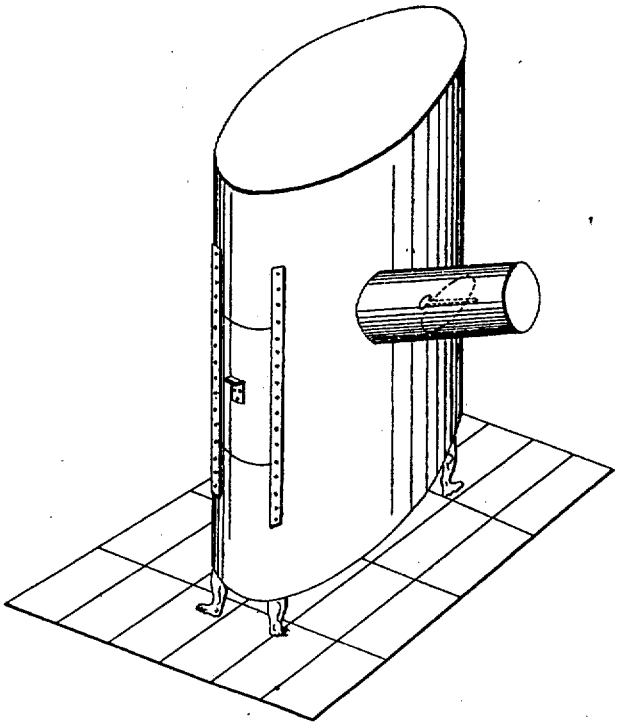
Figure 2:
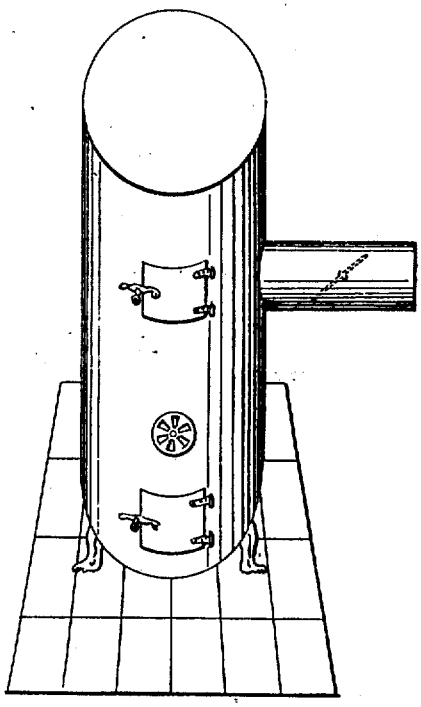
Figure 3:
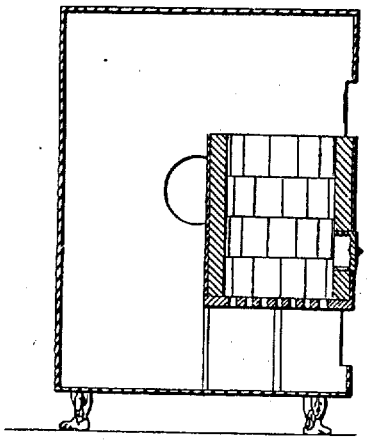
Figure 4:
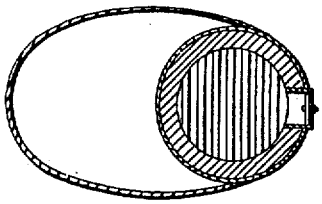

I. ORR.

Heating Stove.

RX No. 48. Reissued Nov. 12, 1842.

9331X Related Doc

Witnesses:
Garonn Clarkson
S. E. Sewall

Inventor:
Isaac Orr

UNITED STATES PATENT OFFICE.

Rx 48

ISAAC ORR, OF GEORGETOWN, DISTRICT OF COLUMBIA.

IMPROVEMENT IN AIR-TIGHT STOVES.

9331 Related doc

Specification forming part of Letters Patent dated January 20, 1836; Reissue No. 48, dated November 12, 1842.

*To all whom it may concern:*

Be it known that I, ISAAC ORR, of Georgetown, in the District of Columbia, have invented a certain new and useful Improvement in Stoves for Heating Rooms and for other Purposes, called the "Air-Tight Stove," of which the following is a specification.

The main objects of my invention are to keep a store of air and fuel hot and otherwise prepared in the highest useful degree for combustion; to cause the same hot air in the stove to circulate many times to, through, and around the fuel and fire; to keep the air of the room soft, moist, and mild in the highest useful degree, and to keep a low fire burning steadily for several days without tending.

The following is a full and exact description of my invention: The said air-tight stove, when intended for burning wood or charcoal, is represented in the drawing hereunto annexed numbered 1. The stove may be made of Russia sheet-iron or other sheet or other thin metal; but Russia iron is considered the best material. A stove of the size represented in the drawing may be made of one sheet of iron about four and a half feet long and twenty-eight inches wide. The two ends should be clinched together as nearly as possible air-tight. It should be made of an elliptical shape, about two-thirds as wide as it is long. It is best to blunt the ends of the ellipse; but the sides should be full. This is considered the most convenient shape, though any other curve may be used, and a stove of which the body was not curved might be used, though not so advantageously. The sheet so formed is for the sides and ends of the stove, and may be joined either in the middle of the back, which I consider the best place, or in any other part of the circumference. The top of the stove, as well as the bottom, may be made flat or curved, of sheet-iron or other thin metal, and should be firmly fastened on as nearly as possible air-tight. A stove of the size represented in the drawing is sufficient for an apartment of twelve or fourteen feet square and ten or twelve feet high. They may be made larger or smaller in proportion to the size of the room to be heated.

On that end of the stove which would be east if the stove-back were north an opening should be cut for the door, so that when the door is done its opening will be about six inches wide and eight inches high and about nine inches clear above the bottom of the stove. The door being thus placed, there will be a large space in the stove above the top of the door, and of course above the fuel, which may be called the "air-chamber." If the door is thin, it must be a sliding door, made as nearly as possible air-tight when closed, with a stout handle that will do to rap. If the door be thick, it may be a hinge-door, which is best of cast-iron, made to shut as tightly as possible on a frame of cast-iron riveted tightly to the stove. If a sliding door be used, the lower end of it must project inward, so as to keep in the black fluid, which would otherwise run down and deface the outside of the stove; or a projection may be made on the outside of the stove, under the door, to catch the black fluid; and in a cast-iron door the under part ought to project sufficiently into the stove for the same purpose. If a sliding door be used, it will need no aperture in it or under it for admitting the air; but if a hinge-door be used it is best to have a tight register either in the door or close below it. The door is placed on the side indicated as the most convenient in the using; but it may with equal effect be placed on the other end or on the side opposite the funnel, provided it is raised as high from the bottom of the stove. The flue of the stove should be placed near the middle of the stove-back, so as to have the top of its opening an inch or two above the top of the door, and should be made as nearly as possible air-tight at its junction with the stove, as well as in its circumference. The flue should be about five inches in diameter and from ten inches to three feet long, according to circumstances. The farther the stove stands from the chimney the more freely the air circulates behind it, and consequently warms the apartment better. The damper should be placed in the flue about four inches from the back of the stove, though a few inches difference in distance will make but little difference in effect. The axis of the damper should be strong enough to bear a wrench. The axis of the damper should be horizontal or sloping and at right angles to the axis of the flue. The top of the damper should open from the stove, in order to let out the hot air over it and the fresh air for the fire under it, when desired, as in warm or moderate weather. The stove should be raised by feet from four to six inches from the floor. The higher it is raised the better it will warm the room in consequence of the freer circulation of the air underneath; but it warms a person's feet better to be low down. If the stove be made of more than one sheet of iron, the upper sheet should run into the lower at the joint, as should any joints of funnel where it is used, in order that the black fluid which is made may run inward.

The mode of using the stove to the best advantage is as follows: Stop your fire-place or chimney, (best with brick,) so as to make and keep it perfectly air-tight, (by putty, if necessary,) except an opening with a collar of the exact size to admit the stove-pipe, and another opening, best also with a collar, at the bottom, immediately below the stove-pipe and four or five inches across, to serve as a ventilator. Its door may be of thin light wood, both sides well fitted and covered with soft woolen cloth, and set on edge or nicely hung on wires, so as to flap readily; or the whole ventilator may be of metal; but its joints must be very tight. All the joints of the stove and fire-place should be made and kept as tight as possible, for both health and economy depend upon it. The passage of the heat into the room and of the air about the stove should be free and unobstructed. The larger the stove the better and more economical; and it should never be less than to hold wood for thirty-six hours, and yet not be half full. Do not bend or batter it and press or rap the door inward in moving it. Stove-pipe is bad, but if it must be used it must be very tight, upright, or considerably sloping, and its joints must enter downward. Kindle the fire at first as in any common stove. When this is once done, so that coals are formed in the morning, shut the ventilator, move the coals and brands (never less than a peck) well to the front of the stove and the ashes to the ends of the stove, cover the middle hollow with the flat sides of one or two sticks, and then put in so much hard dry wood (large and close as convenient) that there will be sure to be enough for at least thirty-six hours. If the fire rages, shut the door a moment to check it. When the fire is more than hot enough, shut the door within about the eighth of an inch, or enough (found by trial) to keep the fire at the right heat, and then shut the damper as close as it may be without the smell of smoke above the stove. Keep the room perfectly comfortable; but comfortably cool instead of comfortably hot is best for the health. Regulate by the damper in warm weather. At bed-time shut the door tight and leave the damper just so far open (found by trial) as to keep the fire alive. If it cannot be checked enough, have the stove made tighter. Leave open the ventilator at night—wholly in warm or good weather and partly in cold or bad. The air of the room may be freshened at any time in the day by opening the ventilator for a few minutes; but with neat people this is rarely needed. Take the ashes out of the stove once in two or four weeks. They lessen the effect. Once in a month or two bring the whole stove nearly to a red heat by a brisk fire, and as soon as it is cooled scrape off the soot with a pretty sharp shovel or other instrument, and scrape the pipe about the damper with a case or other knife. To stop puffs or explosions, shut the door and open the damper till the fire is quelled. To avoid them wholly, do not raise the fire too suddenly nor too high. To stop smoke, open the damper wide and make the chimney hotter.

The principle or character by which the stove above described may be distinguished from other inventions may be stated as follows: By having the stove made tight in every part, the fire is completely under the command of the person having charge of it, and no more air is admitted than is necessary and useful. By having the aperture for the draft raised high above the floor of the stove, the air admitted through it is not drawn directly up through the fuel, but mixes with the hot air and sinks down by its specific gravity to the bottom of the stove. Being expanded by passing through and near the fire, it rises again through the fire to the top of the stove. There it parts with its heat to the iron, and the heat is thus communicated to the apartment through the iron. The air, being cooled by the iron, sinks down by the sides of the stove, parting with its heat to them, and thus warming the apartment. While it is thus descending other air is rising to the top of the stove, and air which has just descended is again expanded by the fire and again rises to the top. A constant circulation to, through, and around the fuel and fire is thus kept up in the stove, and the smoke and heated air pass off very slowly through the smoke-pipe, because there is not sufficient new air admitted to carry it off rapidly, on account of the tightness of the stove, and because the aperture of the smoke-pipe, particularly if diminished by the damper's being partially closed, is too small to carry off at once more than a small part of the air, which is in constant circulation. By this circulation nearly all the oxygen of the air and most of the smoke are consumed before they escape, thus making a great saving of fuel, and the air which passes through the fire is the greater part of it heated, and thus the bad effects of cold air poured on the fire are avoided. If the register or sliding door be entirely closed, cold air is admitted through the smoke-pipe on its lower side while the smoke and heated air are passing off on its upper side. The large chamber for the circulation of the smoke and air above the fuel is essential to the operation of this stove, because, if there were no such chamber, little or no circulation could take place, and the smoke and heated air would pass off too rapidly. It is also important that the stove should be made of sheet-iron or other thin material, in order to have the heat rapidly taken from the heated circulating air and smoke and transmitted to the apartment. It is also important that the smoke-pipe should be low down in the stove, for if it were at the top or near the top the smoke and heated air rising to the top would pass away too rapidly. It is also important that the stove should be oval or curved, because such a shape always leaves a space between the side of the stove and the wood, through which the air may pass.

The peculiar advantages and effects of the air-tight wood-stove may be summed up as follows: The fire is easily regulated. A store of wood sufficient for from one to seven days can be kept constantly hot, dried, and charred and slowly burning without any attention. Very little air but what is heated ever comes in contact with the fire, as a store of heated air is always kept in the large air-chamber of the stove, and mixes with the fresh air admitted before it touches the fire. By means of the circulation of the hot air and smoke the whole stove is kept at nearly the same temperature. The temperature of the apartment is regulated with the greatest ease and a uniform temperature preserved for any length of time. The air of the room is rendered soft and mild, and so moist that a thick dew is often deposited on the windows, even in mild weather, and the air is never injured by coming in contact with red-hot iron. A cough or headache is relieved and even cured by the air. The furniture and wood-work are less shrunk and cracked by the use of this stove than even by summer weather. The chimney, being closed at the ventilator and heated by day and open during the night, rapidly renews the air of the room and makes it drier and less chilly, while it is colder.

A great economy of fuel is effected by this stove, as almost all the heat made in it is saved and given out to the apartment, instead of being carried away through the flue. It also effects a great economy of time, as it uses much less fuel and has to be supplied with fuel much less frequently than any other stove known, and as the combustion can be regulated with so great ease and certainty.

The air-tight stove, when used for burning fossil coal, is varied in some particulars from the air-tight wood-stove.

The annexed drawing numbered 2 presents an end perspective view of the air-tight coal-stove of the same size of the wood-stove. The outer case of this coal-stove is in all respects like that of the air-tight wood-stove, except in the construction and in the management of the doors and apertures for draft. There should be two doors, each about five inches wide by four high, one of them about two inches clear above the bottom of the stove, and the other directly above it, and about four or six inches clear below the top of the stove. Between these doors, inside, fasten a circular sheet-iron casing for the furnace or burner, large enough to contain coal for at least forty-eight hours; or the end of the stove may form half the furnace-casing, and the other half may be fastened by its ends to the stove.

Fixing the furnace against the front side of the stove, instead of the end, heats the room better, though it is less simple; and having a space between the furnace and the stove on all sides makes the radiation in the room milder. The furnace is best lined, but it will do without, or it may be made of cast-iron. This furnace should be open both at top and bottom to the main space in the stove, so that the same hot air in the stove may circulate freely and fast up through the fuel and fire, and outside of the furnace, and down along the sides of the stove and through its main space; or the same purpose may be attained less perfectly and economically by a returning flue or flues of thin material conveying the hot air from above the fire and bringing it again to and through the fuel and fire. Between the two stove-doors, and about two or three inches clear above the furnace-grate, cut an opening into the furnace, with a register on the outside and a grating on the inside. The opening should be an inch and a half or more in diameter. This may be called the "blower" of the fire. This blower should be opened only to kindle or raise the fire, or keep it at a high heat, and when it is shut the draft should be regulated by the lower or ashes door of the stove, or by another register, which may be called the "stove-register," opening into the main space of the stove. The blower may be enlarged to any desirable size, so as to show the fire, being covered with a grate inside to keep in the coal.

The drawing numbered 3 represents a vertical section of the air-tight coal-stove running through the center of the furnace at the doors, and the drawing numbered 4 a horizontal section of the stove and furnace made at the blower. Instead of having the blower at the side, as above directed, a part of the furnace-grate itself may open to the room, if another portion of it open to the air in the stove.

The air-tight coal-stove may also be used for burning wood and other fuel.

The great and most distinguishing principles or characteristics of the air-tight coal-stove are the same in nature and very nearly in degree as those of the air-tight wood-stove; and in addition to these the coal-stove has, first, a distinct and independent construction to make the same hot air in the stove circulate many times to, through, and around the furnace, fuel, and fire; second, a register opening directly from the room into the furnace, fuel, and fire, and distinct from the main passage or avenue for the admission and circulation of the air. This is a peculiar application by organic means of the blowing principle. It might be omitted without injury except when kindling and raising the fire.

Adjust and manage the coal-stove in all respects as the wood-stove, except as here follows: Kindle with charcoal, (wood will smoke and dirty the stove,) having all the passages shut but the blower and flue-damper. At bed-time open the ventilator, and shut all the other passages but the damper, which must be left so far open as to keep the fire alive, or at the desired heat, (found by trial.) If the fire will still either go out or burn too fast, then use coal of a smaller size, and the object may be further aided by covering the coal with coal-dust or the furnace with an iron or other cover. In the morning shut the ventilator, fill the furnace with coal, shut all the passages but the blower and damper till the fire is more than hot enough, then shut the blower, open the ashes door or lower register, so as to keep the fire at the right heat, (found by trial,) and leave the damper so far open that it will be sure not to force any of the fumes of the fire into the room. Clear the furnace when it will not hold coal enough for thirty-six hours, and take out the ashes when they become troublesome. Clean the whole stove when it is so foul as sensibly to injure the effect.

What I claim as my invention is as follows:

1. The air-tight wood-stove, as before described, in the combination of the following particulars, to wit: first, its being made substantially air-tight in all its joints; second, the large air-chamber for the circulation of smoke and air; third, its being made of sheet-iron or other suitable thin material; fourth, the damper; fifth, the putting of the aperture for the draft high above the bottom of the stove; sixth, the putting of the smoke-flue low down; seventh, having the sides of the stove curved, as described, leaving space between them and the wood for the air and smoke to circulate.

2. The combination of the following particulars in a stove for burning wood, to wit: first, its being made of sheet-iron or other suitable thin material; second, its being made substantially air-tight in all its joints; third, the damper; fourth, the large air-chamber for the circulation of the smoke and air; fifth, the putting of the apertures for draft high above the bottom of the stove; sixth, the putting of the smoke-flue low down, as before described.

3. The combination of the following particulars in a stove for burning wood, to wit: first, its being made of sheet-iron or other suitable thin material; second, its being made substantially air-tight in all its joints; third, the damper; fourth, the large air-chamber for the circulation of smoke and air; fifth, the having the aperture for draft raised high above the bottom of the stove, as before described.

4. The combination of the following particulars in a stove for burning wood, to wit: first, its being made of sheet-iron or other suitable thin material; second, its being made substantially air-tight in all its joints; third, the damper; fourth, having the aperture for draft raised high above the bottom of the stove, as before described.

5. The combination of the following particulars in a stove for burning wood, to wit: first, having the aperture for draft raised high above the bottom of the stove; second, its being made substantially air-tight in all its joints; third, the damper; fourth, the large air-chamber for the circulation of smoke and air, as before described.

6. The air-tight coal-stove, as before described, in the combination of the following particulars, to wit: first, the having its outer casing made of sheet-iron or other suitable thin material; second, the having the stove made substantially air-tight in all its joints; third, the damper; fourth, the furnace or receptacle for fuel inside; fifth, the air chamber or chambers open to the fire both at top and bottom, so that the same hot air may circulate repeatedly through the fire; sixth, the blower separate from the aforesaid air chamber or chambers and admitting the air from the room to the fire.

7. The combination of the following particulars in a stove, to wit: first, the having its outer casing made of sheet-iron or other suitable thin material; second, the having the stove made substantially air-tight in all its joints; third, the damper; fourth, the furnace or receptacle for fuel inside, having a space between it and the sides of the stove; fifth, the air chamber or chambers for the circulation of the hot air, as before described.

8. The combination of the following particulars in a stove, to wit: first, its having an outer casing or covering; second, its being substantially air-tight in all its joints; third, the furnace or receptacle for fuel inside, having a space between it and the sides of the stove, as before described.

9. A stove having a furnace or receptacle for the fuel, open at its lower part to the air of the room, and also open both at its top and bottom to the air and smoke circulating in the stove, so that the air and smoke may circulate repeatedly to and through the fire, as before described.

10. A stove having a furnace or receptacle for the fuel, open both at its top and bottom to the air and smoke circulating in the stove, so that the air and smoke may circulate repeatedly to and through the fire, as before described.

In witness whereof I, the said ISAAC ORR, hereto subscribe my name, in presence of the witnesses whose names are hereto subscribed, this 31st day of October, A. D. 1842.

ISAAC ORR.

In presence of—
J. H. GODDARD,
CALVIN GODDARD.